Sept. 21, 1937.    T. M. ELFVING ET AL    2,093,552
ABSORPTION REFRIGERATING APPARATUS
Filed Oct. 12, 1933    2 Sheets-Sheet 1

INVENTORS
Thore Martin Elfving
AND
Hans Hylander
BY
Busser, Harding
ATTORNEYS.

Sept. 21, 1937.   T. M. ELFVING ET AL   2,093,552
ABSORPTION REFRIGERATING APPARATUS
Filed Oct. 12, 1933   2 Sheets-Sheet 2

INVENTORS
Thore Martin Elfving
AND
Hans Hylander
BY
Busser & Harding
ATTORNEYS.

Patented Sept. 21, 1937

2,093,552

UNITED STATES PATENT OFFICE 2,093,552

ABSORPTION REFRIGERATING APPARATUS

Thore Martin Elfving and Hans Hylander, Stockholm, Sweden, assignors, by mesne assignments, to Servel, Inc., Dover, Del., a corporation of Delaware Application October 12, 1933, Serial No. 693,278
In Sweden October 20, 1932

5 Claims. (Cl. 62—118)

The present invention relates to intermittently working absorption refrigerating apparatus and provides novel and simple means for regulating and controlling the heating and cooling of the boiler-absorber without use of complicated means involving valves, bellows, springs, etc. The invention has for its object a preferably air-cooled absorption refrigerating plant, which may consist of two co-operating and alternating intermittently operating apparatus. An absorption apparatus or plant in accordance with the invention operates automatically and reliably, the switching between heating and cooling of the boiler-absorbers being carried out by forces generated inside the apparatus.

Figure 1:
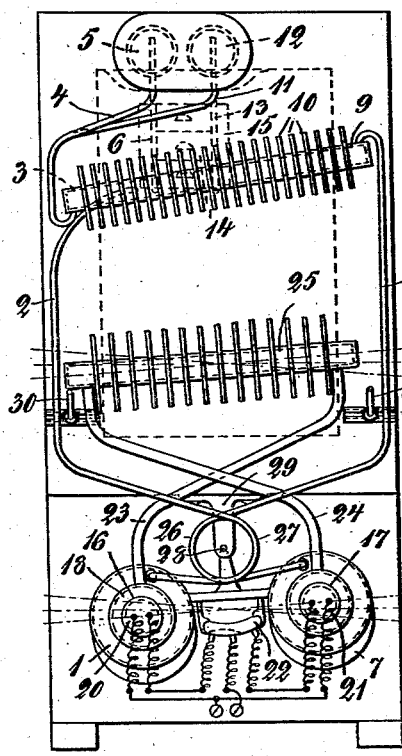
Figure 2:
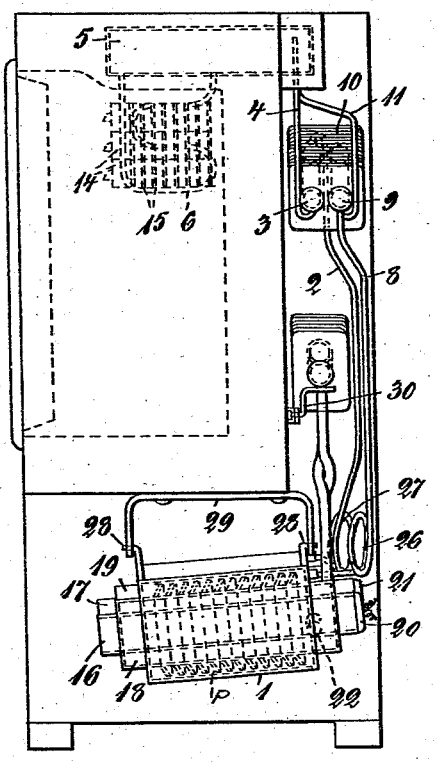
Figure 3:
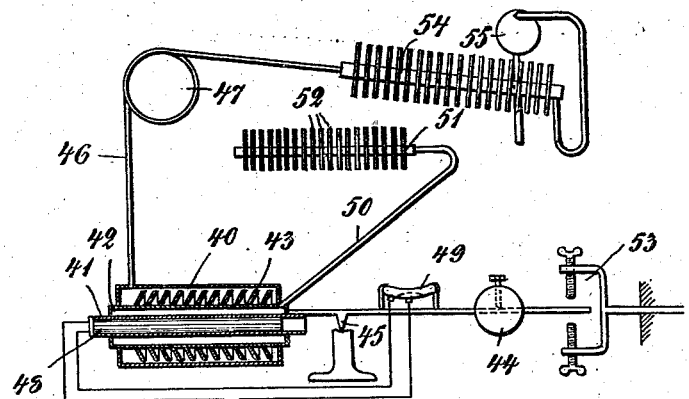
Figure 4:
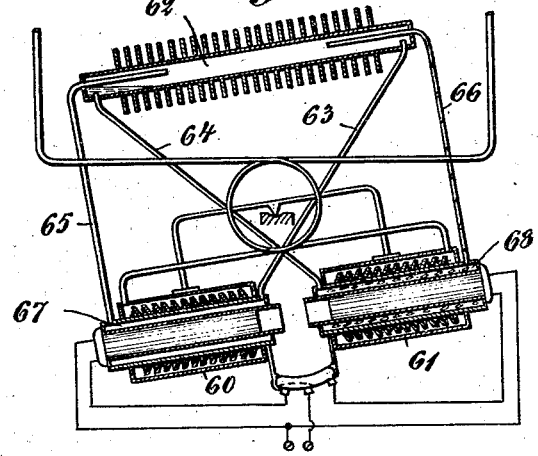

The invention will be more closely described in conjunction with the accompanying drawings, of which Figure 1 shows a front section of a system comprising two co-operating apparatus provided with a cooling system in common for both of the boiler-absorbers. Figure 2 shows a side view of the system shown in Figure 1. Figure 3 shows a single intermittent apparatus according to the invention. Figure 4 shows a modification of the apparatus shown in Figures 1 and 2.

The units shown in Figures 1 and 2 consist of two separate but interdependent, intermittent absorption systems. The first of said systems consists of a boiler-absorber 1, communicating by means of a pipe 2 with a condenser 3 from which a conduit 4 leads to a vessel 5. An evaporator coil 6 communicates with said vessel. The second system consists of a boiler-absorber 7 communicating by means of a conduit 8 with a condenser 9. The condensers of the two systems are built together and adapted to be cooled by cooling flanges 10 in common. From condenser 9 a conduit 11 extends to a vessel 12, which communicates with an evaporator coil 13. The evaporator coils 6 and 13 surround an ice tray compartment 14 and are also provided with cooling flanges 15. The boiler-absorbers are provided with central tubes 16 and 17 respectively, which are surrounded by intermediate tubes, forming cooling pockets 18 and 19. The tubes are provided with flanges P, between which a solid absorbent is stored. The absorbent may consist of calcium chloride, strontium chloride, silica gel, or other solid absorbing or adsorbing substances or mixtures thereof. The vessels 5 and 12 are preferably insulated from each other and from the surroundings. The boiler-absorbers 1 and 7 are to be alternatingly heated with electric heating elements 20 and 21, which are connected with a three-way mercury switch 22 as shown in the figure. The cooling pockets 18 and 19 communicate through pipes 23 and 24 with a condenser 25 forming a separate cooling system without fluid communication with the absorption systems proper, said separate system being partially filled with a volatile liquid such as ammonia for transfer of heat from the boiler-absorbers to the condenser 25. Each cooling pocket may alternatively be provided with its own separate cooling system. The boiler-absorbers 1 and 7 and the separate cooling system are rigidly connected with each other. Together they are movably arranged on bearings 28 in bracket 29.

The conduits 2 and 8 are relatively small in diameter and are run in spirals or loops, 26 and 27 respectively, so as to be sufficiently flexible to permit the boiler-absorbers 1 and 7, et cetera, to move freely on their bearings. Thus the boiler-absorbers with the separate cooling system can be set in different inclinations as indicated in the figure. When reversing the inclination of the condensing element 25 the collecting place for the condensate is shifted from one of the aforementioned cooling pockets to the other. The mercury switch is disposed on the movable system and adapted to switch the heat supply from one of the boiler-absorbers to the other simultaneously with the reversing of the condensate collection place in the separate cooling system. In the case of gas heating instead of electric heating the movable system is adapted to operate a three way gas cock in a similar way. The angle of movement of the movable system is limited by means of adjustable stops 30 and 31. The fulcrum point of the movable system should be located a little below the center of gravity of said system so that a certain predetermined leverage is necessary for moving the system from one extreme position to the other. The power for reversing the balance will be automatically generated inside the apparatus and is produced by the variations in weight of the boiler-absorbers which normally take place during the cycles of operation. The operation of the apparatus as shown in Figures 1 and 2 is as follows.

We will assume that the movable system is in the position indicated in Figure 1 and that the mercury switch 22 causes the boiler-absorber 1 to be heated. The condenser of the separate cooling system has now such an inclination that the collecting place for the condensate will be the cooling pocket of the boiler-absorber 7, which consequently will be cooled, the heat being dissipated into the air due to the evaporation-recondensation of the condensate. It is being assumed that the boiler-absorber 7 has been recently heated and that absorption is now going on there. Thus the weight of the boiler-absorber 7 is steadily increasing. At the same time the expulsion of refrigerant from boiler-absorber 1 results in a decrease of weight. When the weight difference between the boiler-absorbers has reached a certain predetermined value, the movable system tilts over to the other extreme position, so that the heat supply is switched over from boiler-absorber 1 to boiler-absorber 7. At the same time the cooling action of the separate secondary system is switched towards boiler-absorber 1. By this method a simple and reliable automatic cooperation of the two absorption systems is accomplished so that the cooling cycles will closely follow upon one another, giving a semi-continuous refrigeration effect as a result.

The weight difference necessary for reversing the movable system should be chosen with regard to the amount of absorbent in the boiler-absorbers, the heat input, and the desired refrigerating effect, so that a suitable amount of refrigerant is distilled off from the boiler-absorbers during each heating period. Overheating of the boiler-absorber should be avoided. It is an important feature of an apparatus in accordance with the invention that the cycling depends upon a certain weight difference between the boiler-absorbers at the beginning and the end of a period. Due to this, the working conditions of the boiler-absorbers will always be stabilized, and the temperature interval of the boiler-absorbers will automatically accommodate itself to varying external conditions.

Figure 3 shows a single absorption system operating under the control of the weight variation of the boiler-absorber. A boiler-absorber 40 is provided with a central tube 41 surrounded by an intermediate tube forming a cooling pocket 42, flanges 43 carrying the absorbent being disposed on said intermediate tube. The boiler is connected with a counterweight 44 the system balancing on an edge 45. The boiler-absorber communicates with a condenser 54 and an evaporator 55 through a pipe 46, which in a portion of its length forms a spiral or a loop 47 for the purpose of increasing its flexibility. The boiler-absorber is heated by means of an electric heating element 48 the electric current passing a mercury switch 49 placed on the balance and participating in its movement. The cooling pocket 42 communicates through the pipe 50 with a separate condenser 51 cooled by flanges 52. The separate condenser may alternatively be cooled by cooling water, in which case the water conduit should be connected with the water main by means of flexible conduits such as rubber hose or the like. The separate secondary cooling system is filled with a limited amount of volatile liquid that all of the liquid can be stored in the condenser during the heating period.

The apparatus operates in the following manner. It is assumed that the movable system is tilted to the left, i. e. the boiler-absorber is in position to be heated. The volatile liquid is stored in the condenser 51, and the cooling pocket is empty. Heating of the boiler-absorber will cause refrigerant to be expelled therefrom, which will condense in the condenser and flow into the evaporator 55. When a predetermined amount of refrigerant has been liberated, the weight of the boiler-absorber will have been lowered sufficiently to cause the balance to tilt towards the right. The weight limits of the boiler-absorber during each period can be adjusted by varying the angle of tilting by means of the adjusting device 53 and by altering the position of the counterweight. When the balance is tilted towards the right, the electric current is switched off, and the separate secondary cooling system is put into action, whereby the boiler-absorber is quickly cooled and the absorption begins. At the end of the absorption period the balance will again be automatically reversed, to the left, and the heating period begins anew. The length of the absorption period depends upon the cold requirements, i. e. the rate of absorption. The quantity of cold per period is fairly constant, as always the same total amount of refrigerant is required to cycle back and forth to the boiler-absorber. The minor variations which will occur, are due to condensate temperature losses. The cooling effect of the apparatus per hour can be governed by means of an ordinary electric thermostat disposed in the electric circuit comprising the mercury switch. This thermostat will turn off the current (or the gas if gas heating is used) independent of the reversing switch, so that the initiation of the heating periods are more or less delayed. It is also possible to use a multiple step heating element so that the thermostat will select that step which corresponds to the demand.

Figure 4 shows a modified design of a separate secondary cooling system in conjunction with two coordinated absorption systems. The main difference relative to the systems shown in Figures 1 and 2 and 3 lies with the method of circulating the volatile liquid in the separate cooling system. In the cooling system described in Figures 1, 2, and 3, the communication between the secondary condenser, and each cooling pocket is brought about by means of only one comparatively heavy conduit, in which gaseous and liquid medium pass in opposite directions during the cooling period. In Figure 4 the cooling pockets of the boiler-absorbers 60 and 61 are each communicating with the condenser 62 by two narrow conduits, pipes 63 and 64 respectively leading condensate to the lower ends of cooling pockets 67 and 68 to be cooled, and pipes 65 and 66 respectively forming a passage for the gasified fluid from the cooling pockets. The operation of the apparatus is in all other respects analogous to that described in conjunction with Figures 1 and 2.

Other possible modifications, falling within the scope of the invention will be obvious to those skilled in the art.

We claim:—

1. Absorption refrigeration system including a boiler-absorber, a heat dissipating member located at a level above said boiler-absorber, and a heat absorbing member in thermal transfer relation with said boiler-absorber, said boiler-absorber being constructed and arranged to move up and down in a substantially vertical plane in accordance with variations in weight of fluid therein, and said members being constructed and arranged to be moved responsive to movement of said boiler-absorber, and connected to form a circuit for heat transfer fluid in which liquid fluid can flow to said heat absorbing member from said heat dissipating member when said boiler-absorber is in one position but not when it is in another.

2. Absorption refrigeration apparatus including a boiler-absorber, a vaporization-condensation member having a vaporization portion in thermal transfer relation with said boiler-absorber, said boiler-absorber being constructed and arranged to move up and down in a substantially vertical plane in accordance with variation in weight of fluid therein, and means for controlling flow of liquid to said vaporization portion responsive to movement of said boiler-absorber.

3. Absorption refrigeration apparatus including a plurality of boiler-absorbers, a heat dissipating member, and heat absorbing members each arranged in thermal transfer relation with one of said boiler-absorbers, said boiler-absorbers being constructed and arranged to alter their relative positions in accordance with variation in weights of fluid therein, said heat dissipating member and heat absorbing members being constructed and arranged to be moved responsive to movement of said boiler-absorbers, and each of said heat absorbing members being connected to said heat dissipating member to form circuits for heat transfer fluid having said heat dissipating member in common, and in which circuits liquid fluid may flow by gravity from said heat dissipating member to but one of said heat absorbing members in one relative position of said boiler-absorbers and only to another of said members in another relative position of said boiler-absorbers.

4. Absorption refrigeration apparatus including a plurality of boiler-absorbers, a vaporization-condensation member having vaporization portions each in heat transfer relation with one of said boiler-absorbers, said boiler-absorbers being constructed and arranged to alter their relative positions in accordance with variation in weights of fluid therein, and said member being constructed and arranged so that liquid may flow to but one of said vaporization portions in one relative position of said boiler-absorbers and only to another of said vaporization portions in another relative position of said boiler-absorbers.

5. Absorption refrigeration apparatus including two boiler-absorbers, a vaporization-condensation member having two vaporization portions each in heat transfer relation with one of said boiler-absorbers, said boiler-absorbers being constructed and arranged to alter their relative positions in accordance with variation in weights of fluid therein, and means for preventing flow of liquid to one or the other of said vaporization portions responsive to alteration in the relative position of said boiler-absorbers.

THORE MARTIN ELFVING.
HANS HYLANDER.